Figure 1:
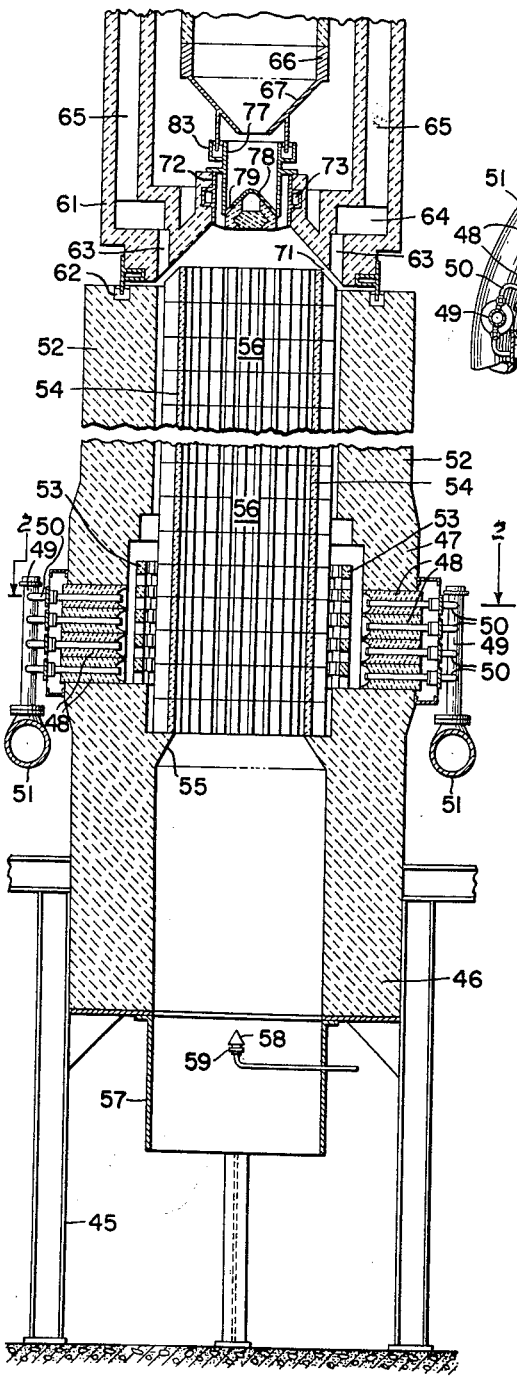

Jan. 1, 1963 E. BLAHA 3,071,358
APPARATUS FOR FORMING CLAY SPHERES
Filed March 19, 1962

INVENTOR.
EMIL BLAHA

ATTORNEY.

3,071,358
APPARATUS FOR FORMING CLAY SPHERES

Emil Blaha, Cheltenham, Pa., assignor to Selas Corporation of America, Dresher, Pa., a corporation of Pennsylvania
Filed Mar. 19, 1962, Ser. No. 180,731
5 Claims. (Cl. 263—30)

The present invention relates to the expansion of clay particles, and more particularly to a furnace in which the clay in granular or pellet form is heated to fusion temperature. At this temperature, each of the clay particles bloats or expands to form a hollow sphere.

In the prior art, hollow clay spheres have been formed by discharging clay particles in a stream in an elongated flame. As the particles travel with the flame, they are heated to fusion temperature and expand. This operation causes the stream of particles to spread, and due to their tacky condition, many of them adhere to the walls of the chamber in which they are being made. In a relatively short time, the accumulation on the walls of the chamber becomes so great that the equipment has to be shut down for cleaning. So far as I am aware, equipment of this type has never been commercially successful because of the short operating periods and the low yield of an acceptable product.

It is an object of this invention to provide apparatus for expanding clay particles, in which the particles fall freely through a heated zone where they are fused and expanded. It is a further object of the invention to provide a method and apparatus for making hollow clay spheres in which the tendency for the material to stick to the apparatus is greatly diminished.

Another object of the invention is to provide means to control the supply of clay particles to the fusing zone of the apparatus, and means to withdraw the fused spheres so that there is substantially no agglomeration thereof.

The invention includes structure forming a vertically extending furnace chamber having a preheating chamber located thereabove.

Means is provided to supply particles first to the preheating chamber and then through a flow controlling device to the furnace chamber. The particles fall freely through this latter chamber, and are heated to the fusion temperature while they are falling. At the lower end of the chamber, they are chilled and discharged to a point of collection.

The present application is a continuation-in-part of my application Serial No. 20,692, filed April 7, 1960, entitled, Apparatus for Forming Clay Spheres.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 2:
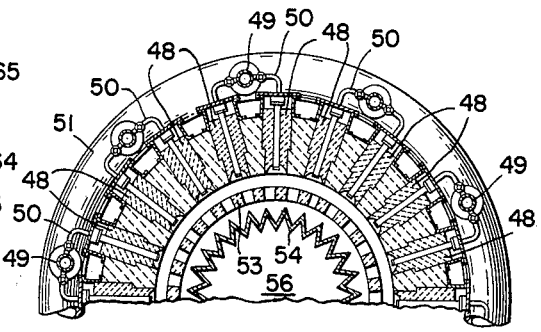
Figure 3:
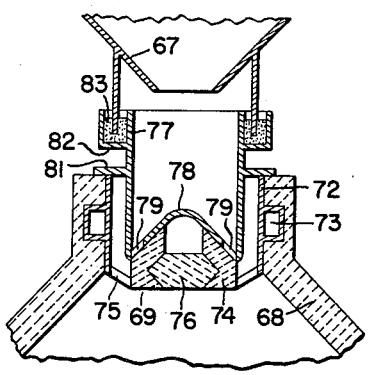

In the drawings:

FIG. 1 is a sectional view of the furnace chamber;
FIG. 2 is a section taken on line 2—2 of FIG. 1; and
FIG. 3 is an enlarged sectional view of the particle feeding means of FIG. 1.

The furnace of FIG. 1 is supported above floor level on a steel framework 45, which also includes suitable reinforcing members for the refractory work that forms the furnace proper. The furnace includes a refractory cooling section 46, which consists of a cylindrical chamber that is a continuation of the heating section built above it. Immediately above the cooling section is a burner section 47, which includes a plurality of vertical rows of burners 48 that are directed radially toward the center of the furnace chamber. These burners 48 are shown as being of the type shown in Patent No. 2,215,079, and each vertical row is connected to a vertical manifold 49 by a suitable pipe connection 50, each of which has a valve therein. The individual vertical manifolds are connected to a supply pipe 51 for a combustible mixture of gas and air that supplies the burners with fuel. The upper portion 52 of the furnace is built up of suitable insulating and refractory brick to the top of the furnace chamber. Radially inward of the burners is a circular checkerwork 53. A muffle wall 54 is mounted on suitable bricks, which extend outwardly from the walls as shown at 55, which bricks also serve to close the lower portion of the space between the outer walls and the muffle. This muffle is shown herein as forming the furnace chamber and fusion zone 56, through which the clay particles are dropped. In this case, the muffle will be of a material that has a good heat transfer rate, and is formed with a zig-zag profile, as is best shown in FIG. 2 of the drawing. This particular configuration of the muffle provides a large radiating surface to radiate heat into chamber 56, as well as permitting the muffle to be made thin so that it can be heated to a high temperature and still have strength enough to be self-supporting.

The lower end of the cooling zone is provided with a metal extension 57, in which is placed a radiation shield. This shield consists of a burner 58 that is located centrally of the extension, and is provided with an annular slot 59, through which fuel can be discharged to burn in a circular sheet.

The top of the furnace, with the particle feeding mechanism carried thereby, is built as a unit. This top is shown generally at 61, and rests on the upper edge of the furnace structure, with a sealing means, such as a sand seal 62, provided between the two. The top is provided with a series of vertical passages 63 that are in communication with the space between the outer wall of the furnace and the muffle wall 54, through which the products of combustion from the burners are exhausted. These passages are connected with an annular passage 64 that is in turn connected with ducts 65 that extend to the preheat chamber.

The preheat chamber is also supported above the furnace chamber by a suitable framework. The lower end of the preheat chamber is shown at 66 in FIG. 1, and is provided with a cone 67 attached to its lower end, through which the particles falling from that chamber are collected and directed toward the feeding device between the preheat chamber and the furnace or fusion chamber.

The interior surface of top 61 is substantially conical in shape, as shown at 68, and terminates in an inlet opening 69 that is concentric with the furnace chamber. It is noted that a small space 71 is provided between the upper end of the muffle 54 and surface 68 of the top, through which a small amount of the products of combustion may escape at certain times, as pointed out below.

The feed mechanism for the particles is located in inlet 69. This mechanism includes a metallic liner 72 for the inlet which is provided with a water cooling passage 73, so that the metallic parts of this feed mechanism are kept within a safe temperature range. Located across the inlet opening and attached to liner 72 is a guide and stopper or valve 74 that has a conical upper surface. This member is fastened to the liner by suitable narrow supports 75, which supports will not interfere with the flow of particles past them. The guide 74 is provided with a refractory insert or plug 76 to protect it somewhat from the heat of the furnace. Particles flowing from cone 67, at the lower end of the preheat chamber, fall into a collector sleeve 77 that is provided with a bottom in the shape of an inverted cone 78, as shown in the drawings. A plurality of openings 79 are formed in cone 78 adjacent to the inner wall of the sleeve. These openings are arranged in a ring, so that the particles passing through them will fall through the furnace chamber in an annular column. This sleeve is slightly smaller in diameter than the diameter of liner 72, and is provided with a flange 81 that rests on the top of the liner when the bottom 78 is resting upon the guide 74. The sleeve is also provided with an upper flange 82 that is engaged by a lifting mechanism, (not shown), to raise and lower the sleeve, and therefore, control the flow of particles into the furnace chamber. It is noted that this flange 82 forms part of a seal, that can be a sand seal 83, between this part and cone 67.

In the operation of the apparatus, the burners 48 are supplied with a combustible mixture of fuel and air which is ignited. This mixture will burn along the surface of the burner cups to heat them and the checkerwork 53 immediately in front. The checkerwork will act to increase the speed of the combustion, so that the capacity of the burners is thereby increased. The checkerwork also serves the purpose of smoothing out any unevenness in temperature of the muffle, that may be obtained by the spot heating effects that sometime occur when burners of the type disclosed are too close to the muffle wall for their firing rate. The hot products of combustion rise through the space between the furnace outer wall and the muffle wall to heat the latter for its entire length. These products are discharged through passages 63 and 65 into the preheat chamber, where they will heat by contact the particles being dropped therethrough. Since the upper end of the furnace is sealed, there can be no escape of products of combustion through the upper end thereof. No draft will occur in the chamber, so that it is not necessary to have a closed bottom. A large amount of radiation can be lost, however, through the opening in the bottom of the furnace if some means is not provided to offset this loss. This is the purpose of the burner indicated at 58. This burner produces a sheet of flame across the bottom of the chamber that will reflect radiation back into the furnace, and thereby prevent a loss of any considerably amount of heat through the opening.

The particles that fall through the preheat chamber are directed into sleeve 77. When this sleeve is lifted, the particles run through openings 79 in a series of streams over the guide 74, to fall in an annular stream or column through the fusion zone formed by chamber 56. Normally, more particles are supplied to the sleeve than can be passed through openings 79, whereby the sleeve is kept full at all times. When the supply of particles falls off, the sleeve is lowered. Because of the individual streams from openings 79, the annular column of falling particles is sufficiently broken so that radiation can penetrate into the center of the column to heat all of the particles uniformly, and thereby increase the efficiency of the fusion operation.

When sleeve 77 is in its lower position, as shown in FIG. 3 of the drawings, flange 81 rests against the top of liner 72 to close opening 69 completely. When the sleeve is raised, however, so that particles can flow through openings 79 into the fusion chamber, a small annular passage is opened between liner 72 and flange 81, through which gases from slot 71 can flow. This small amount of gas flowing at a low velocity through the annular opening between the liner and sleeve will serve to carry away any dust that may have been formed by attrition of the particles during their fall through the preheat chamber and the sleeve. Thus, those particles which flow into the fusion chamber are dust-free. This means that the heat that would ordinarily be absorbed by dust produced as the particles rub against each other can be used for fusing of the particles. In addition, there is no dust to float in the atmosphere of the chamber and stick to the muffle wall. Any suitable means placed below the furnace opening can be used to collect the fused particles.

It will be seen that the furnace is so constructed that a very large radiating surface of an even temperature throughout its area is provided. Furthermore, the flow of particles into this chamber is such that they are dropped vertically in a steady stream that can be penetrated by radiation, in order to heat the particles uniformly; thereby producing an efficient and commercially practical apparatus for fusing clay particles into hollow spheres.

From the above description, it will be seen that I have provided an apparatus in which clay particles are first preheated and then supplied in a vertically descending column through a chamber in which they are fused. These particles are then discharged from the chamber to a point of collection. The apparatus is so designed that the particles will fall freely, and will not engage the surface of the chamber wall. The flow of particles can be regulated so that they fall vertically, and the falling column is loose enough so that all of the particles can be heated to fusion temperature before reaching the bottom of the furnace chamber.

While in accordance with the provisions of the statutes, I have illustrated and described the best form of embodiment of my invention now known to me, it will be apparent to those skilled in the art that changes may be made in the form of the apparatus disclosed, without departing from the spirit and scope of the invention, as set forth in the appended claims, and that in some cases, certain features of my invention may be used to advantage without a corresponding use of other features.

What is claimed is:

1. Apparatus for fusing clay particles comprising in combination structure forming a pair of vertically displaced chambers having a restricted passage between them, means to supply particles to the upper chamber to fall therethrough and through said second chamber, and means to control the flow of particles to said second chamber including a stopper partially obstructing said passage, a hollow cylindrical member having its lower end closed and resting on said stopper, said end being provided with a ring of openings that are closed by said stopper, means to direct particles from said upper chamber into said cylindrical member, means to raise and lower said cylindrical member to control the flow of particles through the openings in the end thereof, and means to heat said lower chamber to the fusion temperature of the clay particles.

2. In apparatus for fusing clay particles, the combination of structure forming a vertically extending furnace chamber, a vertically extending muffle in said chamber and spaced from the wall thereof, burners in said structure adjacent to the lower end of said muffle to heat the same, the products of combustion rising in the space, means at the top of said structure to withdraw the products of combustion, means above the center of said muffle to introduce particles to be fused into said muffle in a vertically descending annular column or stream, means to control the flow of said particles, said structure being provided with an inlet opening above said chamber and in which said means to introduce includes a stopper smaller than said opening located across the same, a sleeve having a bottom therein concentric with said stopper and adapted to rest on the same, said bottom being provided with a ring of openings closed by said stopper, means to supply particles to said sleeve, and means to raise said sleeve whereby particles can flow through said opening around said stopper in an annular column into said chamber.

3. The combination of claim 2 including means to introduce some of said products of combustion into the space at the top of said muffle to flow through said inlet, and means on said sleeve to stop flow of said products of combustion through said inlet when said sleeve is resting on said stopper.

4. Apparatus for fusing clay particles including in combination structure forming a vertically extending furnace chamber with an inlet at the top and an open bottom, a stopper smaller than said opening and having a conical upper surface located across the same, a hollow cylindrical sleeve having a bottom closing complementary to said stopper resting on the same, said bottom closing provided with a ring of openings adjacent to its edge that are normally closed by said stopper, means to supply particles to said sleeve, means to raise said sleeve from said stopper so particles can run through said openings around said stopper to fall through said chamber in an annular stream, and means to heat said chamber to fuse said particles as they are falling through the chamber.

5. The combination of claim 4 including means forming a radiation shield across the bottom of said chamber.

No references cited.